(12) United States Patent
Zhu et al.

(10) Patent No.: US 10,650,556 B2
(45) Date of Patent: *May 12, 2020

(54) SYSTEM AND METHOD FOR IMAGE DATA PROCESSING IN POSITRON EMISSION TOMOGRAPHY

(71) Applicant: UIH AMERICA, INC., Houston, TX (US)

(72) Inventors: Wentao Zhu, Houston, TX (US); Hongdi Li, Houston, TX (US)

(73) Assignee: UIH AMERICA, INC., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/544,418

(22) Filed: Aug. 19, 2019

(65) Prior Publication Data
US 2019/0371017 A1    Dec. 5, 2019

Related U.S. Application Data

(63) Continuation of application No. 15/687,473, filed on Aug. 26, 2017, now Pat. No. 10,410,383.

(51) Int. Cl.
*G06T 11/00* (2006.01)
*G06T 7/73* (2017.01)

(52) U.S. Cl.
CPC .......... *G06T 11/005* (2013.01); *G06T 11/006* (2013.01); *G06T 7/73* (2017.01); *G06T 2207/10088* (2013.01); *G06T 2207/10104* (2013.01); *G06T 2207/20021* (2013.01); *G06T 2207/20024* (2013.01); *G06T 2207/20212* (2013.01); *G06T 2210/41* (2013.01); *G06T 2211/40* (2013.01)

(58) Field of Classification Search
None
See application file for complete search history.

(56) References Cited

U.S. PATENT DOCUMENTS

| | | |
|---|---|---|
| 8,014,614 B2 | 9/2011 | Cook |
| 8,098,916 B2 | 1/2012 | Thielemans et al. |
| 8,265,365 B2 | 9/2012 | Panin |
| 8,729,480 B2 | 5/2014 | Seidel et al. |
| 9,179,885 B2 | 11/2015 | Georgi et al. |
| 2006/0163485 A1* | 7/2006 | Stearns ................. G01T 1/2985 250/363.03 |

(Continued)

*Primary Examiner* — Samah A Beg
(74) *Attorney, Agent, or Firm* — Metis IP LLC

(57) ABSTRACT

The present disclosure relates to systems and methods for reconstructing a PET image. The systems may execute the methods to acquire PET data of a subject. The PET data may include position information of a plurality of coincident events. The plurality of coincident events may include scattering events and random events. The systems may execute the methods to select a portion of the PET data from the PET data based on the position information. The systems may execute the methods to reconstruct a first preliminary image of the subject based on the selected portion of the PET data, and project the first preliminary image. The systems may execute the methods to may determine, based on the PET data and the projection of the first preliminary image, preliminary correction data relating to the scattering events and the random events.

20 Claims, 9 Drawing Sheets

(56) References Cited

U.S. PATENT DOCUMENTS

| | | | |
|---|---|---|---|
| 2007/0040122 A1* | 2/2007 | Manjeshwar | G01T 1/2985 250/363.03 |
| 2008/0284428 A1* | 11/2008 | Fiedler | G01R 33/28 324/307 |
| 2010/0021034 A1* | 1/2010 | Lenglet | G06K 9/342 382/131 |
| 2010/0098312 A1* | 4/2010 | Leahy | G06T 11/005 382/131 |
| 2011/0001049 A1* | 1/2011 | Shibuya | G01T 1/2985 250/362 |
| 2011/0288407 A1* | 11/2011 | Brinks | A61B 6/032 600/427 |
| 2012/0063658 A1 | 3/2012 | Leroux et al. | |
| 2012/0070050 A1* | 3/2012 | Panin | G06T 11/005 382/131 |
| 2012/0275657 A1 | 11/2012 | Kolthammer et al. | |
| 2012/0278034 A1 | 11/2012 | Dong et al. | |
| 2013/0240721 A1 | 9/2013 | Laurence et al. | |
| 2014/0061483 A1 | 3/2014 | Yoshida et al. | |
| 2015/0363948 A1 | 12/2015 | Leahy et al. | |
| 2016/0356895 A1 | 12/2016 | Burr et al. | |
| 2017/0061629 A1 | 3/2017 | Zhu et al. | |
| 2017/0164911 A1 | 6/2017 | Lv et al. | |
| 2017/0192107 A1 | 7/2017 | Li et al. | |
| 2018/0025512 A1 | 1/2018 | Zhu et al. | |
| 2018/0114346 A1* | 4/2018 | Sun | G01S 7/4866 |
| 2018/0120459 A1 | 5/2018 | Andreyev et al. | |
| 2018/0144513 A1* | 5/2018 | Liu | G06T 11/005 |
| 2018/0353147 A1 | 12/2018 | Wang et al. | |
| 2019/0125280 A1* | 5/2019 | Gu | G06T 11/005 |
| 2019/0355159 A1* | 11/2019 | Bai | H04W 8/005 |

\* cited by examiner

SYSTEM AND METHOD FOR IMAGE DATA PROCESSING IN POSITRON EMISSION TOMOGRAPHY

CROSS-REFERENCE TO RELATED APPLICATIONS

This application is a continuation of U.S. application Ser. No. 15/687,473, filed on Aug. 26, 2017, the entire contents of which are hereby incorporated by reference.

TECHNICAL FIELD

The present disclosure generally relates to image data processing in positron emission tomography (PET), and more particularly, a system and method for processing image data acquired by a PET device with a long axial length.

BACKGROUND

PET has been widely used in clinical examination and disease diagnosis in recent years. A commercial PET scanner currently available typically has a relatively small axial length (e.g., usually 20-30 cm), which usually permits imaging of only a portion of a subject (e.g., a patient) at one time. Recently, PET devices with a long axis length (e.g., 1 meter, 2 meters) have been developed to facilitate the acquisition of PET data. A PET device with a long axial length has a relative wider axial scanning range, providing more PET data than a commercial PET scanner currently available under the same scanning conditions. However, the composition of the PET data acquired by the PET device with a long axial length may be different from that acquired by a commercial PET scanner. For example, the proportion of random event data or the proportion of multiple scattering event data in the entire PET data may be different. Traditional techniques of processing and correcting PET data may be unsuitable for the PET data acquired by a PET device with a long axial length. Thus, it is desirable to provide effective mechanisms for processing and correcting PET data acquired by the PET device with a long axial length.

SUMMARY

According to an aspect of the present disclosure, a system is provided. The system may include at least one storage medium including a set of instructions and at least one processor configured to communicate with the at least one storage medium. The set of instructions, when executed by the at least one processor, cause the system to perform the following operations. The system may obtain, based on a PET device having an axial length, PET data of the subject. The PET data may include position information of a plurality of coincident events. The plurality of coincident events may include scattering events and random events. The system may select, based on the position information of the plurality of coincident events, a portion of the PET data from the PET data. The system may reconstruct, based on the selected portion of the PET data, a first preliminary image of the subject. The system may project the first preliminary image. The system may determine, based on the PET data and the projection of the first preliminary image, preliminary correction data relating to the scattering events and the random events. The system may determine, based on the preliminary correction data relating to the scattering events and the random events, target correction data relating to the scattering events and the random events. The system may reconstruct, based on the PET data and the target correction data, a target image of the subject.

In some embodiments, the axial length of the PET device may be equal to or greater than 0.5 meters.

In some embodiments, the set of instructions, when executed by the at least one processor, cause the system to obtain anatomical information of the subject. The anatomical information of the subject may be obtained based on at least one of Computed Tomography (CT) data of the subject or Magnetic Resonance Imaging (MRI) data of the subject. At least one of the reconstruction of the first preliminary image or the reconstruction of the target image may be performed based on the anatomical information of the subject.

In some embodiments, the anatomical information is obtained based on the CT data. The set of instructions, when executed by the at least one processor, cause the system to perform the following operations. The system may reconstruct, based on the CT data, a CT image of the subject. The system may generate, based on the CT image of the subject, an attenuation map of the subject. The system may reconstruct, based on the attenuation map and the selected portion of the PET data, the first preliminary image of the subject.

In some embodiments, the scattering events may further include single scattering events and multiple scattering events. The set of instructions, when executed by the at least one processor, cause the system to perform the following operations. The system may determine first data relating to the single scattering events, second data relating to the multiple scattering events, and third data relating to the random events. The system may determine the target correction data relating to the scattering events and the random events based on the first data, the second data, the third data, and the preliminary correction data relating to the scattering events and the random events.

In some embodiments, the set of instructions, when executed by the at least one processor, cause the system to perform a low pass filtering on the preliminary correction data relating to the scattering events and the random events.

In some embodiments, the preliminary correction data relating to the scattering events and the random events may be determined by subtracting the preliminary correction data relating to the scattering events and the random events from the PET data.

In some embodiments, the position information of the plurality of coincident events may include a first detector position and a second detector position for each of the plurality of coincident events. The first detector position and the second detector position may correspond to a pair of detector units detecting a coincident event of the plurality of coincident events. The set of instructions, when executed by the at least one processor, cause the system to perform the following operations. The system may determine a detector position difference between the first detector position and the second detector position for each of the plurality of coincident events. The system may select, based on the plurality of detector position differences, the portion of the PET data from the PET data.

In some embodiments, the detector position difference of each of the plurality of coincident events may include a ring difference between the pair of detector units detecting the coincident event. The selected portion of the PET data may correspond to one or more coincident events whose corresponding ring differences are within a ring difference threshold.

In some embodiments, the PET device may include a plurality of imaging blocks. The set of instructions, when executed by the at least one processor, cause the system to perform the following operations. The system may determine a sub-group of the PET data from the PET data for each of the plurality of imaging blocks based on the position information of the plurality of coincident events. The system may designate a sum of the sub-groups of the PET data as the selected portion of the PET data.

In some embodiments, the set of instructions, when executed by the at least one processor, cause the system to perform the following operations. The system may reconstruct a second preliminary image for each of the plurality of imaging blocks based on the corresponding sub-group of the PET data. The system may generate the first preliminary image by stitching the plurality of second preliminary images together.

In some embodiments, at least one of the PET data or the projection of the first preliminary image may be sinogram data.

In some embodiments, the PET device may include a plurality of detector rings forming a detection tunnel having a cylindrical shape.

According to another aspect of the present disclosure, a method is provided. The method may include the following operations. PET data of a subject may be obtained based on a PET device having an axial length. The PET data may include position information of a plurality of coincident events. The plurality of coincident events may include scattering events and random events. A portion of the PET data may be selected from the PET data based on the position information of the plurality of coincident events. A first preliminary image of the subject may be reconstructed based on the selected portion of the PET data. The first preliminary image may be projected. Preliminary correction data relating to the scattering events and the random events may be determined based on the PET data and the projection of the first preliminary image. Target correction data relating to the scattering events and the random events may be determined based on the preliminary correction data relating to the scattering events and the random event. A target image of the subject may be reconstructed based on the PET data and the target correction data.

According to another aspect of the present disclosure, a non-transitory computer readable medium embodying a computer program product, the computer program product may include instructions configured to cause a computing device to perform the following operations. The computing device may be caused to obtain, based on a PET device having an axial length, PET data of the subject. The PET data may include position information of a plurality of coincident events. The plurality of coincident events may include scattering events and random events. The computing device may be caused to select, based on the position information of the plurality of coincident events, a portion of the PET data from the PET data. The computing device may be caused to reconstruct, based on the selected portion of the PET data, a first preliminary image of the subject. The computing device may be caused to project of the first preliminary image. The computing device may be caused to determine, based on the PET data and the projection of the first preliminary image, preliminary correction data relating to the scattering events and the random events. The computing device may be caused to determine, based on the preliminary correction data relating to the scattering events and the random events, target correction data relating to the scattering events and the random events. The computing device may be caused to reconstruct, based on the PET data, and the target correction data, a target image of the subject.

According to another aspect of the present disclosure, a system having at least one processor and storage is provided. The system may include an acquisition module configured to obtain, based on a PET device having an axial length, PET data of the subject. The PET data may include position information of a plurality of coincident events. The plurality of coincident events may include scattering events and random events. The system may include a selection module configured to select, based on the position information of the plurality of coincident events, a portion of the PET data from the PET data. The system may include a reconstruction module configured to reconstruct, based on the selected portion of the PET data, a first preliminary image of the subject. The system may include a projection module configured to project the first preliminary image. The system may include correction module configured to determine, based on the PET data and the projection of the first preliminary image, preliminary correction data relating to the scattering events and the random events. The correction module may be further configured to determine, based on the preliminary correction data relating to the scattering events and the random events, target correction data relating to the scattering events and the random events. The reconstruction module may be further configured to reconstruct, based on the PET data and the target correction data, a target image of the subject Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purposes of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections or assembly of different levels in ascending order. However, the terms may be displaced by other expression if they achieve the same purpose.

Figure 2:
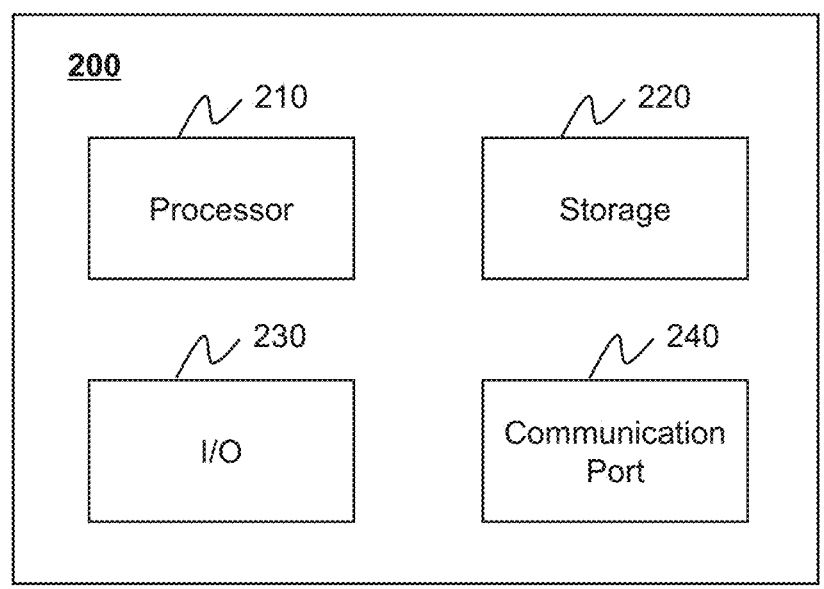
FIG. 2 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purposes of illustration and description only and are not intended to limit the scope of the present disclosure. It is understood that the drawings are not to scale.

For illustration purposes, the following description is provided to help better understanding an imaging process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

The present disclosure relates to systems and methods for reconstructing a positron emission tomography (PET) image. The systems and methods may obtain PET data of the subject based on a PET device having an axial length. The axial length may be 0.5 meters or longer. The PET data may include position information of a plurality of coincident events. The plurality of coincident events may include scattering events and random events. The systems and methods may select, based on the position information of the plurality of coincident events, a portion of the PET data. The systems and methods may reconstruct, based on the selected portion of the PET data, a first preliminary image of the subject. The systems and methods may project the first preliminary image. The systems and methods may determine, based on the PET data and the projection of the first preliminary image, preliminary correction data relating to the scattering events and the random events. The systems and methods may determine, based on the preliminary correction data, target correction data relating to the scattering events and the random events. The systems and methods may reconstruct, based on the PET data and the target correction data, a target image of the subject.

Figure 1:
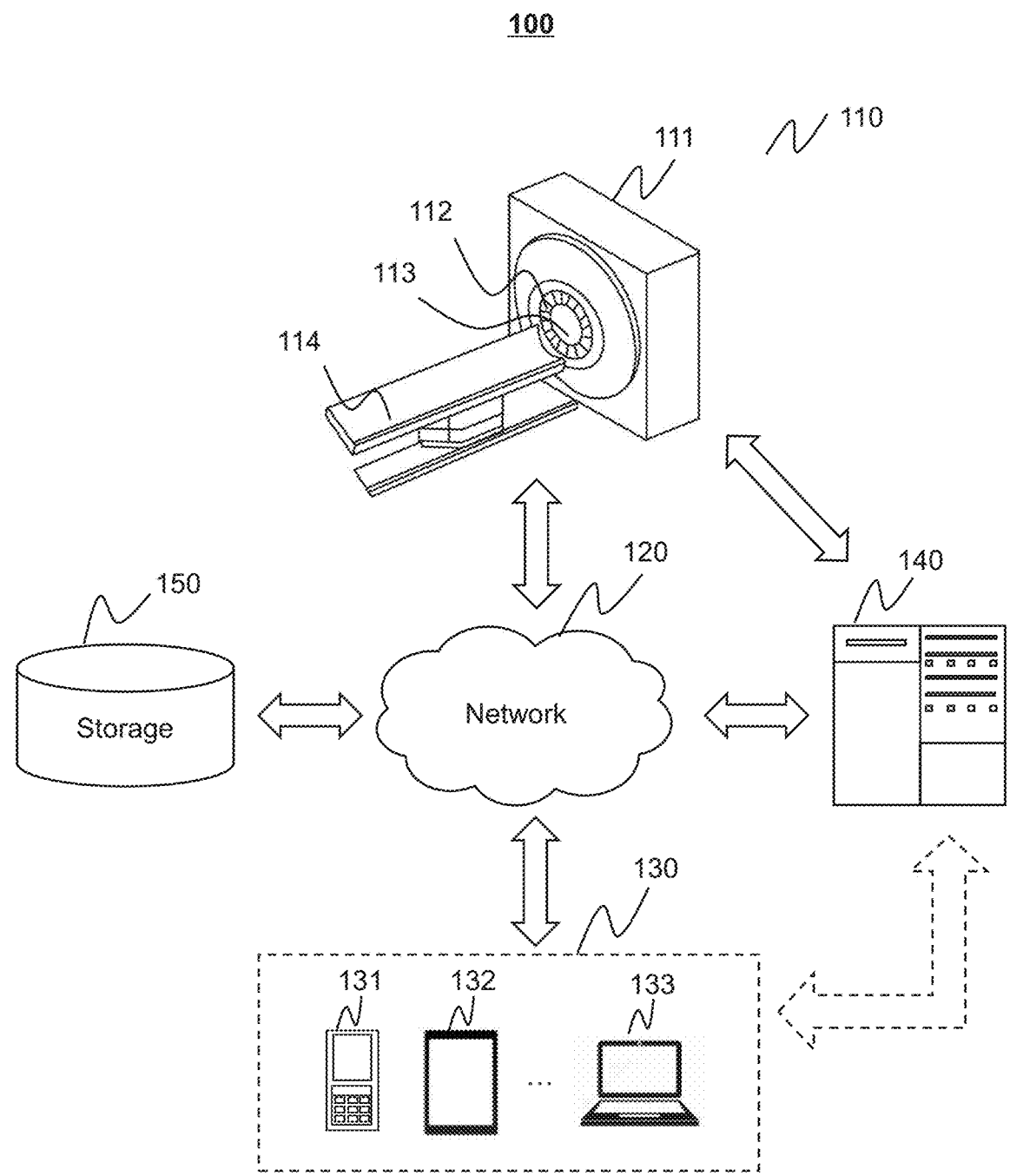
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include a scanner 110, a network 120, one or more terminals 130, a processing engine 140, and storage 150. In some embodiments, the scanner 110, the processing engine 140, the storage 150, and/or the terminal(s) 130 may be connected to and/or communicate with each other via a wireless connection (e.g., the network 120), a wired connection, or a combination thereof. The components in the imaging system 100 may be connected in one or more of variable ways. Merely by way of example, the scanner 110 may be connected to the processing engine 140 through the network 120, as illustrated in FIG. 1. As another example, the scanner 110 may be connected to the processing engine 140 directly. As a further example, the storage 150 may be connected to the processing engine 140 through the network 120, as illustrated in FIG. 1, or connected to the processing engine 140 directly.

The scanner 110 may scan an object, and/or generate a plurality of data relating to the object. In some embodiments, the scanner 110 may be a medical imaging device, for example, a PET device, a PET-CT device, a PET-MRI device, a CT device, etc. In some embodiments, the scanner 110 may be a PET device having a long axial length. As used herein, the PET device with a long axial length refers to a PET device having a longer axial length than a commercial PET scanner currently available. A commercial PET device currently available typically has an axial length in a range of 20 cm to 30 cm. The PET device with a long axial length may have an axial length longer than, for example, 0.5 meters. For example, the axial length of the PET device with a long axial length may be 1 meter, 2 meters, etc. For brevity, a PET device with a long axial length as disclosed herein is referred to as a PET device.

The scanner 110 may include a gantry 111, a detector 112, a detection region 113, and a table 114. A subject may be placed on the table 114 for scanning. In the present disclosure, "object" and "subject" are used interchangeably. The detector 112 may detect radiation events (e.g., gamma photons) emitted from the detection region 113. In some embodiments, the detector 112 may include one or more detector units. The detector units may be assembled in any suitable manner, for example, a ring, an arc, a rectangle, an array, or the like, or any combination thereof. In some embodiments, a detector unit may include one or more crystal elements (e.g., scintillators) and/or one or more photomultipliers (e.g., silicon photomultiplier (SiPM), photomultiplier tube (PMT)). The table 114 may transport a subject into and out of, and facilitate the positioning of the subject in the detection region 113. In some embodiments, the detected radiation events may be stored or archived in a storage device (e.g., the storage 150), displayed on a display, or transferred to an external storage device via a cable, or a wired or wireless network (e.g., the network 120). In some embodiments, a user may control the scanner 110 via the processing engine 140.

In some embodiments, before scanning, a radioactive tracer isotope may be injected into the subject to be scanned. One or more atoms of the tracer isotope may be chemically incorporated into biologically active molecules in the subject. The active molecules may become concentrated in a tissue of interest within the subject. The tracer isotope may undergo positron emission decay and emit positrons. A positron may travel a short distance (e.g., about 1 mm) within a tissue of interest, lose kinetic energy, and interact with an electron of the subject. The positron and the electron may annihilate and produce a pair of annihilation photons. The pair of annihilation photons (or radiation rays) may move in approximately opposite directions. A plurality of radiation rays may reach the detector 112 and be detected by the detector 112.

In some embodiments, one or more coincidence events may be determined based on the interaction positions and the interaction times of a plurality of received photons. If two photons are received and interact with two scintillators of two detector units within a certain time window (e.g., 1 nanosecond, 2 nanoseconds, 5 nanoseconds, 10 nanoseconds, 20 nanoseconds, etc.), the two photons may be deemed to come from the same annihilation, and regarded as a coincidence event (or coincident event). The coincidence event may be assigned to a line of response (LOR) joining the two relevant detector units that have detected the coincidence event. The coincidence events that are assigned to LORs may be projected, and image data may be generated.

The network 120 may include any suitable network that can facilitate the exchange of information and/or data for the imaging system 100. In some embodiments, one or more components of the imaging system 100 (e.g., the scanner 110, the terminal 130, the processing engine 140, the storage 150, etc.) may communicate information and/or data with one or more other components of the imaging system 100 via the network 120. For example, the processing engine 140 may obtain image data from the scanner 110 via the network 120. As another example, the processing engine 140 may obtain user instructions from the terminal(s) 130 via the network 120. The network 120 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the scanner 110, the terminal(s) 130, and/or the storage 150. For example, the processing engine 140 may process image data and reconstruct an image based on the image data. In some embodiments, the processing engine 140 may be a single server or a server group. The server group may be centralized or distributed. In some embodiments, the processing engine 140 may be local or remote. For example, the processing engine 140 may access information and/or data stored in the scanner 110, the terminal(s) 130, and/or the storage 150 via the network 120. As another example, the processing engine 140 may be directly connected to the scanner 110, the terminal(s) 130, and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2. In some embodiments, the processing engine 140, or a portion of the processing engine 140 may be integrated into the scanner 110.

The storage 150 may store data, instructions, and/or any other information. In some embodiments, the storage 150 may store data obtained from the terminal(s) 130 and/or the processing engine 140. In some embodiments, the storage 150 may store data and/or instructions that the processing engine 140 may execute or use to perform exemplary methods described in the present disclosure. In some embodiments, the storage 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform.

Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more other components of the imaging system 100 (e.g., the processing engine 140, the terminal(s) 130, etc.). One or more components of the imaging system 100 may access the data or instructions stored in the storage 150 via the network 120. In some embodiments, the storage 150 may be directly connected to or communicate with one or more other components in the imaging system 100 (e.g., the processing engine 140, the terminal(s) 130, etc.). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal(s) 130, the storage 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors, and thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanner 110, the terminal(s) 130, the storage 150, and/or any other component of the imaging system 100. In some embodiments, the storage 220 may include mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 240 may be connected to a network (e.g., the network 120) to facilitate data communications. The communication port 240 may establish connections between the processing engine 140 and the scanner 110, the terminal(s) 130, and/or the storage 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
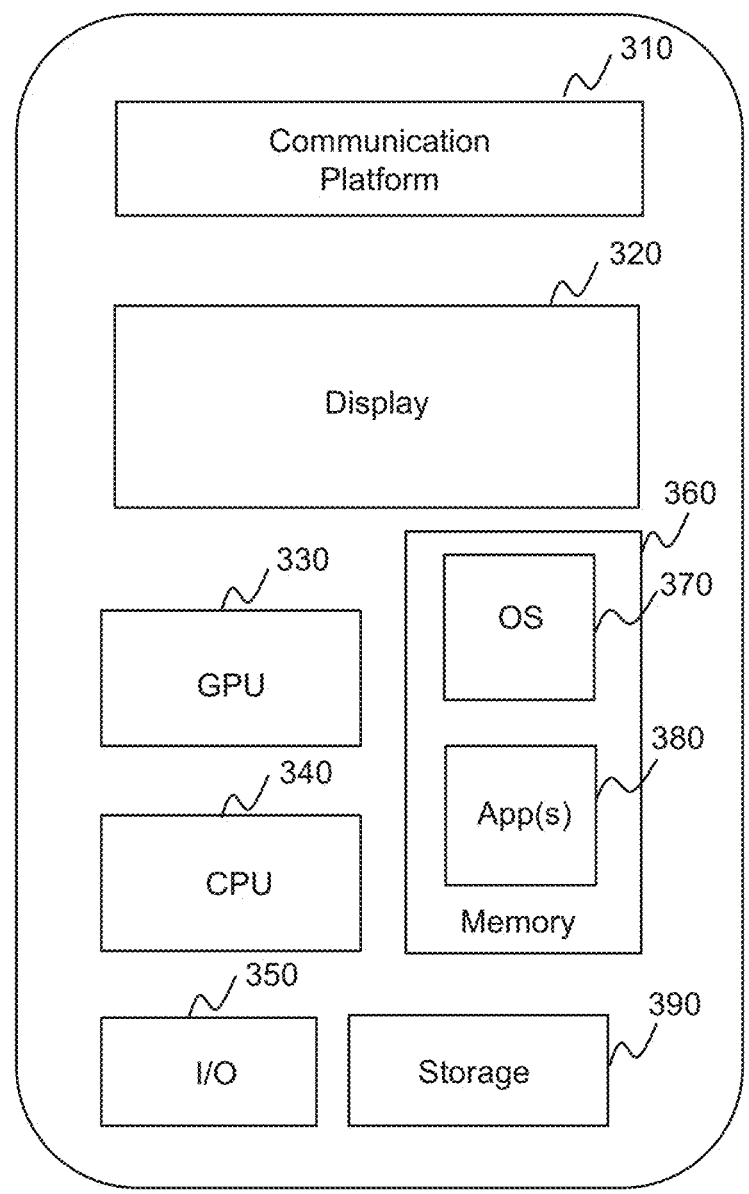
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal(s) 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information respect to image processing or other information from the processing engine 140. User interactions with the information stream may be achieved via the I/O 350 and provided to the processing engine 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

Figure 4:
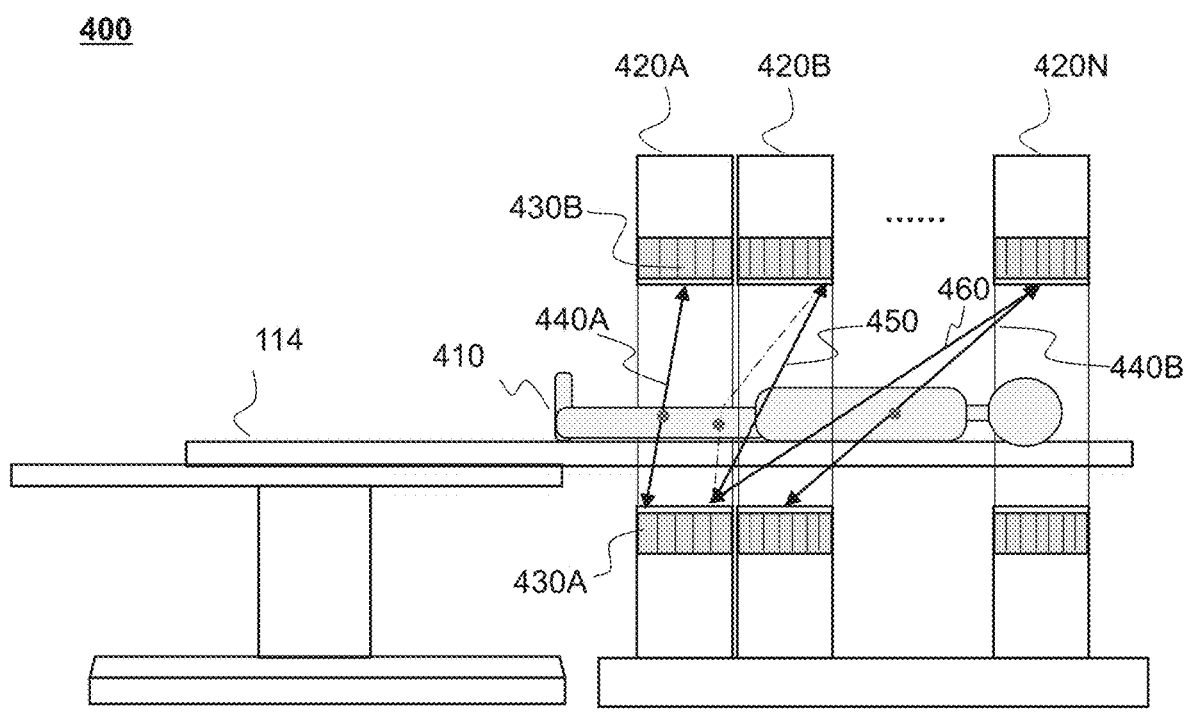
FIG. 4 is a schematic diagram illustrating an exemplary PET device according to some embodiments of the present disclosure.

FIG. 4 is a schematic diagram illustrating an exemplary PET device 400 according to some embodiments of the present disclosure. The PET device 400 may include a table 114, one or more imaging blocks (e.g., an imaging block 420A, an imaging block 420B, . . . , and an imaging block 420N). A subject 410 (e.g., a patient) may be placed on the table 114 for scanning.

In some embodiments, an imaging block may include one or more detector rings (e.g., a detector ring 430A and a detector ring 430B). The numbers of detector rings that different imaging blocks have may be the same or different. The detector rings may be arranged along the axial direction, i.e., a direction along which the subject 410 is moved into and out of the detection tunnel of the PET device 400. A detector ring may include a plurality of detector units arranged along a circumferential surface of the gantry (not shown in FIG. 4) of the PET device 400.

The axial scanning range of the PET device 400 may at least partially depend on factors including, such as the configuration and/or arrangement of the detector rings. For example, the axial scanning range of the PET device 400 may depend on the number of the detector rings, the thickness of the detector rings, the diameters of the detector rings, the shape of the detector units, the number of the detector units, or the type of the detector units, or the like, or any combination thereof.

In some embodiments, the axial scanning range of the PET device 400 may depend on the axial length of the detector rings. As used herein, the axial length of the detector rings may refer to the distance along the axial direction between two detector rings spaced farthest apart from each other in the PET device 400. For example, the PET device 400 may include 1000 detector rings. The thickness of each detector ring may be 2 mm. The axial length of the PET device 400 may be 1000*2 mm, i.e., 2 meters. For brevity, the axial length of the detector rings of a PET device may be referred to as the axial length of the PET device.

In some embodiments, the axial scanning range of the PET device 400 may increase with the increase of the axial length of the PET device 400. For example, a first PET device and a second PET device may have a substantially similar configuration, except that the first PET device has more detector rings than the second PET device. The first PET device may have a wider axial scanning range than the second PET device. The first PET device may acquire more PET data than the second PET device when they perform a scan on a same subject under the same scanning conditions.

During a scan of the subject 410, a plurality of photons generated in annihilation events may reach and be detected by a pair of detector units. If two photons are received and interact with the pair of detector units within a certain time window (e.g., 1 nanosecond, 2 nanoseconds, 5 nanoseconds, 10 nanoseconds, 20 nanoseconds, etc.), the two photons may be deemed to come from the same annihilation, and regarded as a coincidence event. The coincidence event may be assigned to a line of response (LOR) joining the two relevant detector units that have detected the coincidence event.

A coincident event may be a true coincident event, a random event, a scattering event, etc. A true coincident event occurs when two photons from a single annihilation event are detected by a pair of detector units along an LOR (e.g., an LOR 440A and an LOR 440B) within a certain time window. A random coincidence occurs when two photons from two separate annihilation events are detected by a pair detector units along an LOR (e.g., an LOR 460) within a certain time window.

The photons generated by an annihilation event may undergo a Compton scattering while passing through the subject 410. A scattering event occurs when at least one of two photons detected by a pair of detector units along an LOR (e.g., an LOR 450) within the certain time window has undergone at least one Compton scattering prior to their detection. After a scattering event, the photon travels in a direction different from its initial trajectory, and thus conveys poor information regarding its origin or initial trajectory. A scattering event may be a single scattering event or a multiple scattering events. A single scattering event occurs when the pair of photons from an annihilation event undergo a single Compton scattering prior to their detection by two detector units. A multiple scattering event occurs when the pair of photons from an annihilation event undergo multiple Compton scatterings prior to their detection by two detector units.

In some embodiments, the PET data collected by the PET device 400 may include true coincident event data, single scattering event data, multiple scattering event data, random event data, or the like, or any combination thereof. The composition of the PET data may at least partially depend on the axial length of the PET device 400. For example, the probability of occurrence of multiple scattering events may increase with the distance that a photon travels across the subject 410, and the probability that a photon having undergone multiple scatterings is detected may increase in a PET device with a long axial length compared to a PET device with a short axial length. The probability of detections of the random events may increase with the axial length of the PET device 400. Accordingly, the proportion of the multiple scattering event data and the random event data in the PET data may increase with the increase of the axial length of the PET device 400. Traditional correction techniques for correcting PET data with respect to scattering events and random events may be unsuitable for a PET device with a long axial length (e.g., 1 meter, 2 meters).

It should be noted that the above description of the PET device 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the PET device 400 may include any number of imaging blocks. The PET device 400 may include any number of detector rings. As another example, the detector units may be implemented in a suitable manner (e.g., an arc, a rectangle, an array) other than the detector ring as described in connection with FIG. 4.

Figure 5:
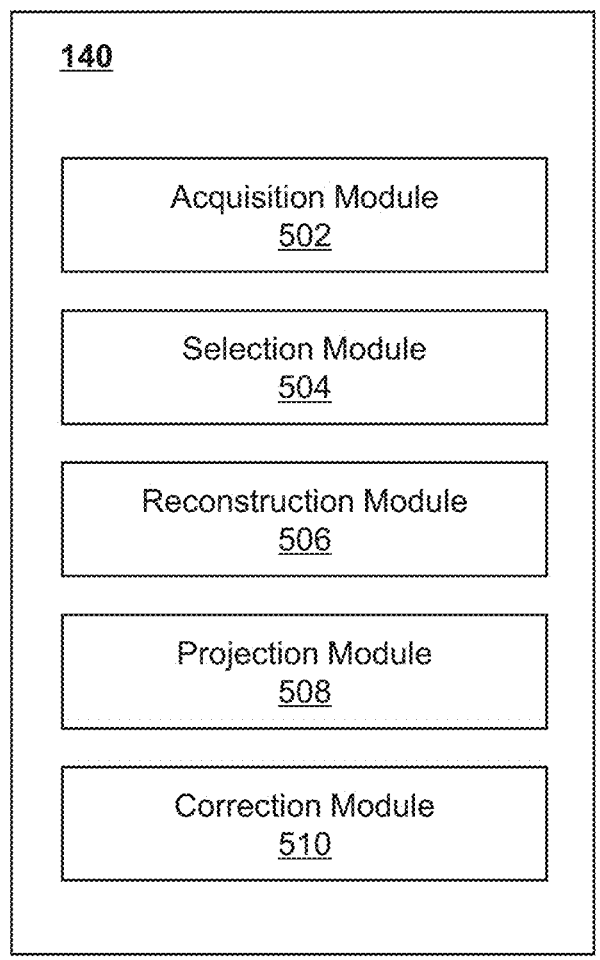
FIG. 5 is a schematic diagram illustrating an exemplary processing engine according to some embodiments of the present disclosure.

FIG. 5 is a schematic diagram illustrating an exemplary processing engine 140 according to some embodiments of the present disclosure. As shown in the figure, the processing engine 140 may include an acquisition module 502, a selection module 504, a reconstruction module 506, a projection module 508, and a correction module 510. At least a portion of the processing engine 140 may be implemented on a computing device as illustrated in FIG. 2 or a mobile device as illustrated in FIG. 3.

The acquisition module 502 may acquire image data. In some embodiments, the acquisition module 502 may acquire the image data from the scanner 110, the storage 150, the terminal(s) 130, and/or an external data source (not shown). In some embodiments, the image data may include raw data (e.g., projection data), instructions, or the like, or a combination thereof. For example, the image data may be generated based on the radiation rays (e.g., gamma rays) that emit from a subject positioned in the detection region 113. In some embodiments, the image data may include information relating to energy, an interaction position, and/or an interaction time of the radiation rays (e.g., gamma rays) with detector units. In some embodiments, the acquired data may be transmitted to the storage 150 for storing. In some embodiments, the acquired data may be transmitted to another module in the processing engine 140 including, e.g., the selection module 504, the reconstruction module 506 for further processing (e.g., a PET image, etc.).

In some embodiments, the imaging data may include PET data. The PET data may include data relating to a plurality of coincident events. For example, the PET data may include true coincidence event data, single event data, random event data, scattering event data, etc. In some embodiments, the PET data may include position information of the plurality of coincident events. The position information of a coincident event may include a first detector position of a first detector unit, a second detector position of a second detector unit, a detector position difference between the first detector position and the second detector position. The first detector unit and the second detector unit may be the pair of detector units that have detected the coincident event. In some embodiments, the imaging data may include CT data. The CT data of the subject may be used to generate an attenuation map of the subject. The attenuation map may be applied in attenuation correction of PET data.

The selection module 504 may select image data according to a selection rule. In some embodiments, the selection module 504 may select PET data based on the position information of a plurality of coincident events. For example, the selection module 504 may select the PET data by removing data of coincident events whose detector position differences exceed a threshold.

The reconstruction module 506 may reconstruct one or more images of a scanned subject. In some embodiments, the reconstruction module 506 may reconstruct the images based on image data acquired by the acquisition module 502, and/or image data retrieved from the storage 150, etc. In some embodiments, the reconstruction module 506 may reconstruct the images according to a reconstruction technique, generate reports including one or more images and/or other related information, and/or perform any other function for image reconstruction in accordance with various embodiments of the present disclosure. Exemplary reconstruction techniques may include an iterative reconstruction algorithm (e.g., a maximum likelihood expectation maximization (MLEM) algorithm, an ordered subset expectation maximization (OSEM) algorithm, a maximum-likelihood reconstruction of attenuation and activity (MLAA) algorithm, a maximum-likelihood attenuation correction factor (MLACF) algorithm, a maximum likelihood transmission reconstruction (MLTR) algorithm, a conjugate gradient algorithm, a maximum-a-posteriori estimation algorithm, a filtered back projection (FBP) algorithm, a 3D reconstruction algorithm, or the like, or any combination thereof.

The projection module 508 may perform a forward projection on one or more images to generate the projection of the images. In some embodiments, the projection module 508 may perform a forward projection on an image based on a system matrix corresponding to the image.

The correction module 510 may correct image data and/or an image. For example, the correction module 510 may determine correction data for PET data. The correction data may relate to scattering events (e.g., single scattering events, multiple scattering events), random events, or the like, or any combination thereof. The correction data may be applied in scatter correction and/or random correction. The correction module 510 may determine the correction data based on one or more correction techniques. Exemplary correction techniques may include a random correction technique, a scatter correction technique, an attenuation correction technique, a dead time correction technique, or the like, or any combination thereof. In some embodiments, the correction data determined by the correction module 510 may be applied in image reconstruction. In some embodiments, the correction module 510 may perform one or more noise reduction techniques to correct image data. Exemplary noise reduction techniques may include data filtering, data transformation, data cleaning, or the like, or any combination thereof. For example, the correction module 510 may filter image data by performing a low pass filtering.

In some embodiments, one or more modules illustrated in FIG. 5 may be implemented in at least part of the exemplary imaging system 100 as illustrated in FIG. 1. For example, one or more modules may be integrated into a console (not shown). Via the console, a user may set the parameters for scanning a subject, acquiring image data, etc. In some embodiments, the console may be implemented via the processing engine 140 and/or an external device (not shown).

It should be noted that the above description of the processing engine 140 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the selection module 504 and the correction module 510 may be integrated into one single module to perform their functions. As another example, the processing engine 140 may include an output module configured to transmit the processed image to the scanner 110, the terminal(s) 130, and/or the storage 150 via the network 120.

Figure 6:
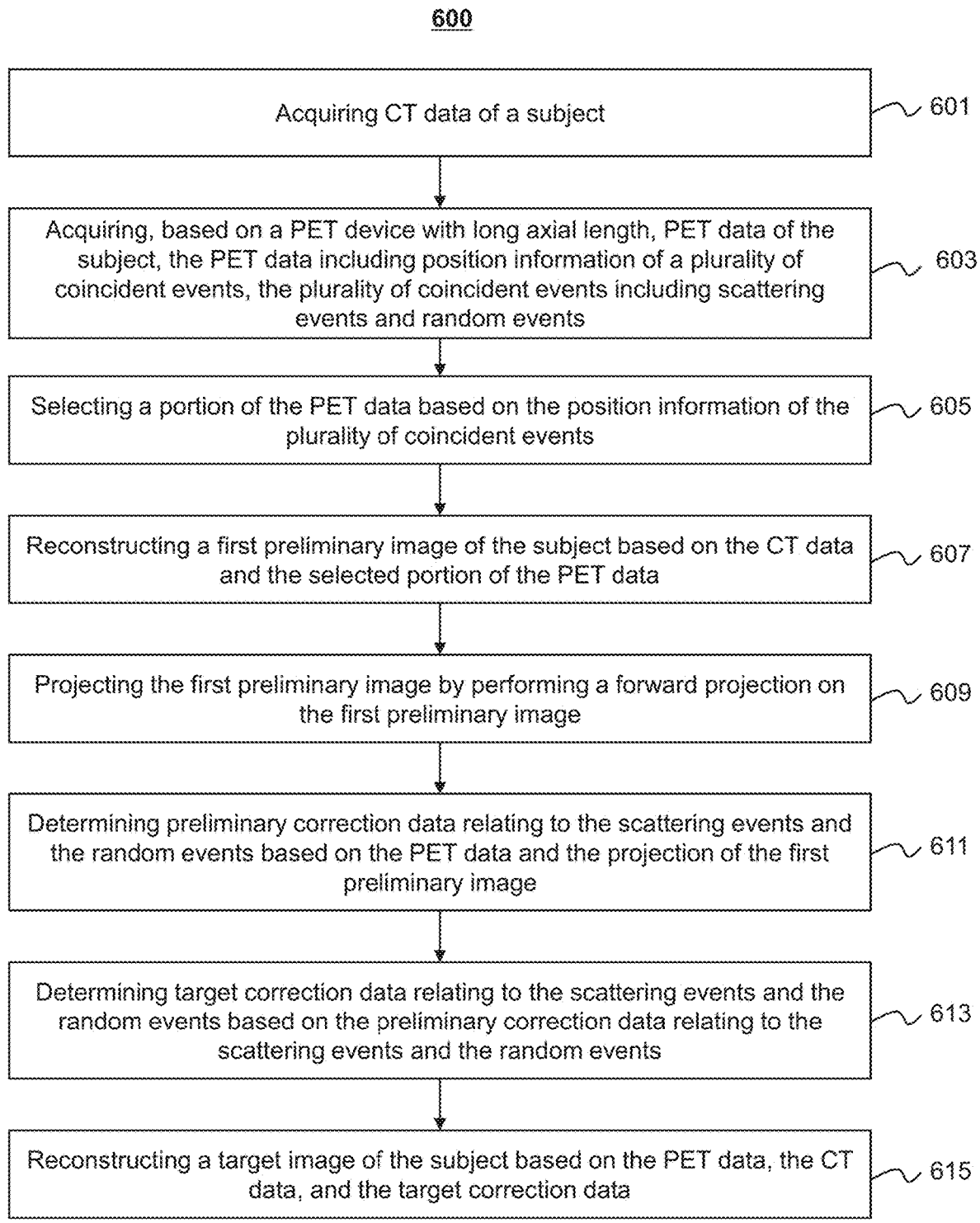
FIG. 6 is a flowchart illustrating an exemplary process for image reconstruction according to some embodiments of the present disclosure.

FIG. 6 is a flowchart illustrating an exemplary process 600 for image reconstruction according to some embodiments of the present disclosure. In some embodiments, one or more operations of the process 600 illustrated in FIG. 6 for generating an image may be implemented in the imaging system 100 illustrated in FIG. 1. For example, the process 600 illustrated in FIG. 6 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3).

In 601, CT data of a subject may be acquired. Operation 601 may be implemented by the acquisition module 502. The subject may include a patient or a part thereof including, e.g., a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

In some embodiments, the CT data of the subject may be acquired by the acquisition module 502 from, for example, a CT system or a PET-CT system (e.g., the imaging system 100 in FIG. 1), the scanner 110, the terminal(s) 130, the storage 150, or an external data source. In some embodiments, the CT data may include anatomical information of the subject. The CT data of the subject may be used to generate an attenuation map of the subject. The attenuation map may be applied in attenuation correction of PET data. Details regarding the application of CT data in attenuation correction may be found elsewhere in the present disclosure. See, e.g., FIG. 7 and the relevant descriptions.

In some embodiments, in 601, the anatomical information of the subject may be obtained. The anatomical information of the subject may be obtained based on, such as CT data, Magnetic Resonance Imaging (MRI) data, PET data of the subject, or the like, or any combination thereof. The anatomical information may be used in attenuation correction of PET data in image reconstruction. For illustration purposes, the present disclosure takes the CT data to be used for attenuation correction as an example.

In 603, PET data of the subject may be acquired. Operation 603 may be implemented by the acquisition module 502. The PET data may be acquired by a PET device with a long axial length. The PET device with a long axial length may refer to a PET device having a longer axial length than a commercial PET scanner as described in connection with FIG. 1. For example, the axial length of the PET device may be at least 0.5 meters, 1 meter, 2 meters, etc.

In some embodiments, the PET data of the subject may be acquired by the acquisition module 502 from, for example, a PET system (e.g., the imaging system 100 in FIG. 1), the scanner 110, the terminal(s) 130, the storage 150, or an external data source.

The PET data may include the trajectory and/or information of a plurality of coincident events occurred during a PET scan of the subject. For example, the PET data may include a list of LORs, transverse and longitudinal positions of the LORs, or the like, or any combination thereof. In some embodiments, the PET data may include position information of the coincident events. The position information of a coincident event may include a first detector position of a first detector unit and a second detector position of a second detector unit corresponding to the coincident event. The first detector unit and the second detector unit may be the pair of detector units having detected the coincident event. A position of a detector unit may include a serial number of the detector ring in which the detector unit is located, a serial number of the imaging block in which the detector unit is located, a distance from the detector unit to a reference position (e.g., the first detector ring of the PET device) along the axial direction, or the like, or any combination thereof.

For example, referring back to FIG. 4, a coincident event along the LOR 440A is detected by a first detector unit of the detector ring 430A (e.g., the first detector ring of the PET device 400) and a second detector unit of the detector ring 430B (e.g., the third detector ring of the PET device 400). The first detector unit and the second detector unit are located in the imaging block 420A (the first imaging block of the PET device 400). The position information of the coincident event presented by the LOR 440A may include a position of the first detector unit (e.g., located in the first detector ring of the first imaging block) and a position of the second detector unit (e.g., located in the third detector ring of the first imaging block).

In some embodiments, the position information of a coincident event may include a detector position difference between the first detector position and the second detector position. The detector position difference between the two detector positions may include a difference between the serial numbers of the detector rings in which the two detector units are located, respectively, a difference between the serial numbers of the imaging blocks in which the two detector units are located, respectively, a distance between the two detector units along the axial direction, or the like, or any combination thereof. For brevity, the difference between the serial numbers of the detector rings in which the two detector units are located, respectively, may be referred as a detector ring difference, and the difference between the serial numbers of the imaging blocks in which the two detector units are located, respectively, may be referred as an imaging block difference. For example, the detector position difference of the coincident event along the LOR 440A illustrated in FIG. 4 may include 2 detector rings difference and/or zero imaging block difference. As another example, for a coincident event detected by a pair of detector units located in the same ring, the ring difference and the imaging block difference may both be 0.

In some embodiments, the PET data may be data stored in the form of a sinogram. For example, an LOR may be defined as $(\rho, \varphi, z)$ as exemplified in FIGS. 10A and 10B. The $\rho$ may refer to the shortest distance between the LOR and the Z axis. The $\varphi$ may refer to an angle formed by the X-axis and the projection of the LOR onto a transaxial plane. The z may refer to the detector ring difference of the LOR. Details regarding the PET data stored in the form of the sinogram may be found elsewhere in the present disclosure. See, e.g., FIGS. 10A and 10B and the relevant descriptions.

In 605, a portion of the PET data may be selected based on the position information of the plurality of coincident events. Operation 605 may be implemented by the selection module 504. As described in connection with 603, the position information of a coincident event may include a first detector position, a second detector position, a detector position difference between the first detector position and the second detector position, or the like, or any combination thereof. The first detector position and the second detector position may correspond to the pair of detector units that detect the coincident event.

In some embodiments, the portion of the PET data may be selected based on the detector position difference of each coincident event. For example, the portion of the PET data may be selected by removing data of coincident events whose detector position differences exceed a threshold. As described in connection with FIG. 4, the probability of detections of multiple scattering events and/or random events may increase with the increase of the axial length of the PET device. A coincident event whose detector position difference exceeds a threshold may be more likely to be a multiple scattering event or a random event. The selected portion of the PET data (i.e., the PET data without data of the coincident events whose detector position differences exceed a threshold) may include a higher proportion of true coincident event data than the PET data.

Merely by way of example, the portion of the PET data may be selected by removing data of one or more coincident events whose detector ring differences are equal to or greater than a detector ring difference threshold. The detector ring difference threshold may be 100, 200, 300, or any other suitable values. As another example, the portion of the PET data may be selected by removing data of one or more coincident events whose imaging block differences are equal to or greater than an imaging block difference threshold. The imaging block difference threshold may be 1, 2, 3, or any other suitable values. In some embodiments, the imaging block difference threshold may be 1 so that only data of coincident events detected by pairs of detector units located in the same imaging block is retained. As yet another example, the portion of the PET data may be selected by removing data of one or more coincident events whose distances along the axial direction between the two detector units are equal to or greater than a distance threshold.

For illustration purposes, the selection of the portion of the PET data based on the detector ring difference is described as an example. A first coincident event may be detected by two detector units located in the $200^{th}$ detector ring and $600^{th}$ detector ring. A second coincident event may be detected by two detector units located in the $300^{th}$ detector ring and the $305^{th}$ detector ring. A third coincident event may be detected by two detector units located in the $100^{th}$ detector ring and the $900^{th}$ detector ring. The detector ring differences of the three coincident events are 400, 5, and 800, respectively. If the portion of the PET data is selected based on a detector ring difference threshold of 200, the data of the first and the third coincident events may be removed and the data of the second coincident event may be retained.

In some embodiments, the position information may include a first detector position and a second detector position of a coincident event. A detector position difference of a coincident event may be determined based on the first detector position and the second detector position by, e.g., the selection module 504. The portion of the PET data may then be selected based on the determined detector position difference of a coincident event.

In 607, a first preliminary image of the subject may be reconstructed based on the CT data and the selected portion of the PET data. Operation 607 may be implemented by the reconstruction module 506. In some embodiments, the first preliminary image of the subject may be reconstructed based on one or more reconstruction techniques suitable for PET image reconstruction. For example, the first preliminary image may be reconstructed based on one or more iterative reconstruction algorithms, such as an MLEM algorithm, an OSEM algorithm, an MLAA algorithm, an MLACF algorithm, an MLTR algorithm, a conjugate gradient algorithm, a maximum-a-posteriori estimation algorithm, or the like, or any combination thereof.

In some embodiments, an attenuation map may be generated based on the CT data for attenuation correction of the selected portion of the PET data. The first preliminary image may be reconstructed based on the attenuation map and the selected portion of the PET data. Details regarding the reconstruction of the first preliminary image may be found elsewhere in the present disclosure. See, e.g., FIG. 7 and the relevant descriptions.

In 609, a forward projection may be performed on the first preliminary image to project the first preliminary image. Operation 609 may be implemented by the projection module 508. As described in connection with operation 605, the selected portion of the PET data may have a higher proportion of true coincident event data than the originally collected PET data (or referred to as PET data for brevity). The first preliminary image may better reflect the true coincident events than an image based on the originally collected PET data. The projection of the first preliminary image may be regarded as an indication of the true coincident event data.

Figure 10A:
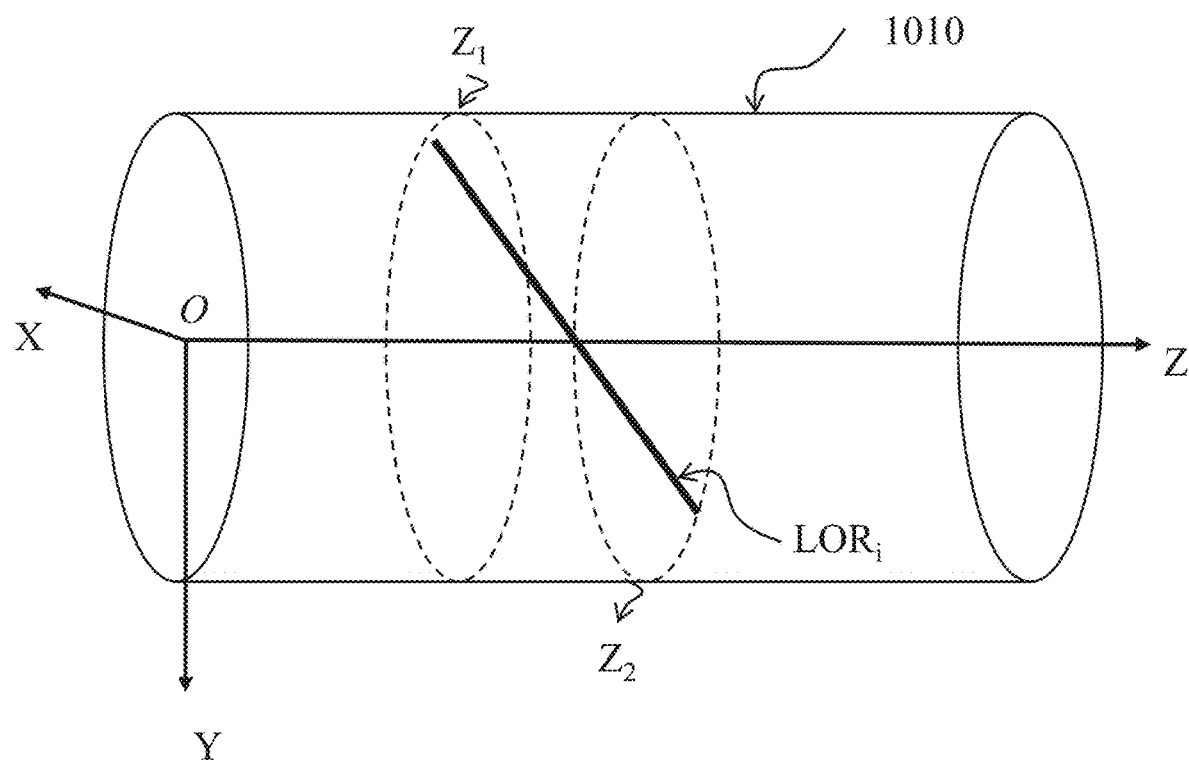
FIGS. 10A and 10B are schematic diagrams illustrating a line of response (LOR) according to some embodiments of the present disclosure.
Figure 10B:
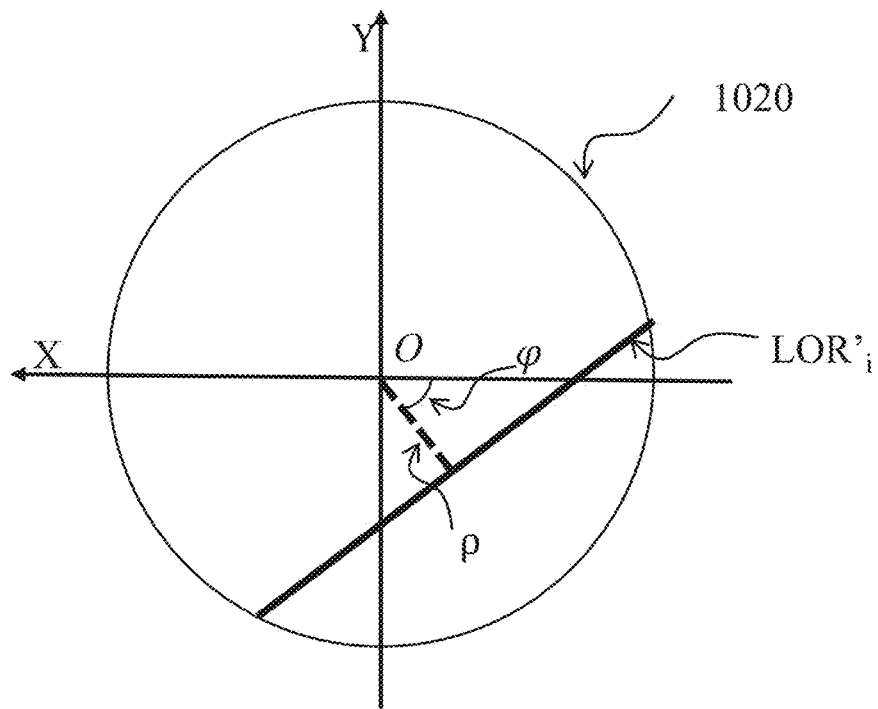

In some embodiments, the forward projection may be performed according to Equation (1) below.

$$t_i = \Sigma_j P_{ij} \tilde{x}_j, \quad (1)$$

where $\tilde{x}_j$, refers to the first preliminary image, $P_{ij}$ refers to a system matrix corresponding to the PET data, $t_i$ refers to the projection of the first preliminary image stored in the form of a sinogram (as exemplified in FIGS. 10A and 10B). The system matrix corresponding to the PET data may represent the probability that photons generated in an annihilation being detected in the $j^{th}$ voxel travel along the $i^{th}$ LOR.

In 611, preliminary correction data relating to the scattering events and the random events may be determined based on the PET data and the projection of the first preliminary image. Operation 611 may be implemented by the correction module 510. The projection of the first preliminary image may be regarded as an indication of the true coincident event data as described in connection with operation 609. The preliminary correction data may be determined by removing the projection of the first preliminary image from the PET data. In some embodiments, the preliminary correction data may be determined according to Equation (2) below:

$$add_i = Y_i - t_i, \quad (2)$$

where $add_i$ refers to the preliminary correction data relating to the scattering events and the random events, and $Y_i$ refers to the PET data.

The $add_i$ may be data stored in the form of a sinogram (as exemplified in FIGS. 10A and 10B). An LOR may be defined as (ρ, φ, z) as exemplified in FIGS. 10A and 10B. The ρ may refer to the shortest distance between the Z axis and the LOR. The φ may refer to an angle formed by the X-axis and the projection of the LOR onto a transaxial plane. The z may refer to a ring difference of the $LOR_i$ (i.e., a difference between the $Z_1$ and $Z_2$).

In 613, target correction data relating to the scattering events and the random events may be determined based on the preliminary correction data relating to the scattering events and the random events. Operation 613 may be implemented by the correction module 510. In some embodiments, the target correction data may be determined by performing one or more operations as described in connection with FIG. 8.

In some embodiments, the target correction data may be determined based on the preliminary correction data according to one or more noise reduction techniques. Exemplary noise reduction techniques may include data filtering, data transforming, data cleaning, or the like, or any combination thereof. For example, a low pass filtering may be performed on the preliminary correction data to generate the target correction data. The low pass filtering may be performed based on one or more low pass filtering algorithms including, such as a Gauss filtering algorithm, a mean filtering algorithm, etc. In some embodiments, the target correction data relating to the scattering events and the random events may be stored in the form of a sinogram (as exemplified in FIGS. 10A and 10B). For illustration purposes, the target correction data relating to the scattering events and the random events may be denoted as $G_i$ indicating additive correction terms including the random and scatter corrections in $i^{th}$ LOR.

In 615, a target image of the subject may be reconstructed based on the PET data, the CT data, and the target correction data. Operation 615 may be implemented by the reconstruction module 506. In some embodiments, the target image may be reconstructed based on one or more reconstruction techniques suitable for PET image reconstruction mentioned elsewhere in the disclosure. For example, the target image may be reconstructed based on one or more iterative reconstruction algorithms, such as an MLEM algorithm, an OSEM algorithm, an MLAA algorithm, an MLACF algorithm, an MLTR algorithm, a conjugate gradient algorithm, a maximum-a-posteriori estimation algorithm, or the like, or any combination thereof.

In some embodiments, the target image and the first preliminary image may be reconstructed based on the same or different reconstruction techniques. In some embodiments, the target image may be reconstructed based on the PET data and attenuation correction information data for the PET data. For example, the attenuation correction information for the PET data may be generated in operation 607 and be applied to the reconstruction of the target image in 615. Details regarding the attenuation correction information may be found elsewhere in the present disclosure. See, e.g., FIG. 7 and the relevant descriptions. As another example, the attenuation correction information may be determined based on other attenuation correction techniques, such as an MLAA-based attenuation correction technique, an MR-based attenuation correction technique, and an Atlas-based attenuation correction technique, etc. In some embodiments, the attenuation correction information may be stored in the form of a sinogram. The attenuation correction information may include one or more elements each of which may indicate the attenuation of photons along an LOR.

Taking the OSEM algorithm as an example, the target image $X^n$ at the $n^{th}$ iteration may be determined based on at least one subset of the PET data and the target image $X^{n-1}$ at the previous iteration. In some embodiments, the reconstruction of the target image based on the OSEM algorithm may be performed according to Equation (3) below:

$$X_j^{n,m+1} = \frac{X_j^{n,m}}{\sum_i A_i P_{ij}} \sum_i A_i P_{ij} \frac{Y_i}{A_i \sum_l P_{il} X_l^{n,m} + G_i}, \quad (3)$$

where $X_j^{n,m+1}$ refers to the target image at the $n^{th}$ iteration using the $(m+1)^{th}$ subset of the PET data, $X_j^{n,m}$ refers to the target image at the $n^{th}$ iteration using the $m^{th}$ subset of the PET data, $Y_i$ refers to the count of coincident events in the $i^{th}$ LOR, $A_i$ refers to the $i^{th}$ element of the attenuation correction sinogram (as exemplified in FIG. 7) corresponding to the PET data, $P_{ij}$ refers to a system matrix corresponding to the PET data, and $G_i$ represents the $i^{th}$ element of the additive correction terms including the random and scatter corrections in $i^{th}$ LOR. The $i^{th}$ element of the attenuation correction sinogram may represent the attenuation of photon along the $i^{th}$ LOR. The system metrix corresponding to the PET data may represent the probability that photons generated in an annihilation being detected in the $j^{th}$ voxel travel along the $i^{th}$ LOR.

It should be noted that the above description of the process 600 is merely provided for the purposes of illustration, and not intended to limit the scope of the present disclosure. For persons having ordinary skills in the art, multiple variations and modifications may be made to the process 600 under the teachings of the present disclosure. However, those variations and modifications do not depart from the scope of the present disclosure. In some embodiments, one or more operations of the process 600 may be added or omitted. For example, operation 601 may be omitted. Operation 607 and/or operation 615 may be performed without the CT data. In some embodiments, the attenuation correction of the selected portion of the PET data and/or the PET data may be performed based on other attenuation correction techniques, such as an MLAA-based attenuation correction technique, an MR-based attenuation correction technique, and an Atlas-based attenuation correction technique, etc. As another example, an image re-processing operation may be added after operation 607 and/or operation 615. In some embodiments, the image re-processing operation may include an artifact correction, such as a motion artifact correction, a metal artifact correction, or the like, or any combination thereof.

In some embodiments, the order of the operations of the process 600 may be changed. For example, operations 601 and operation 603 may be performed simultaneously. As another example, operation 603 may be performed before operation 601. In some embodiments, one or more equations exemplified in the description of the process 600 may be modified. For example, one or more parameters in the Equations (1), (2), or (3) may be replaced or dropped. As another example, one or more parameters may be added to the Equations (1), (2), or (3).

Figure 7:
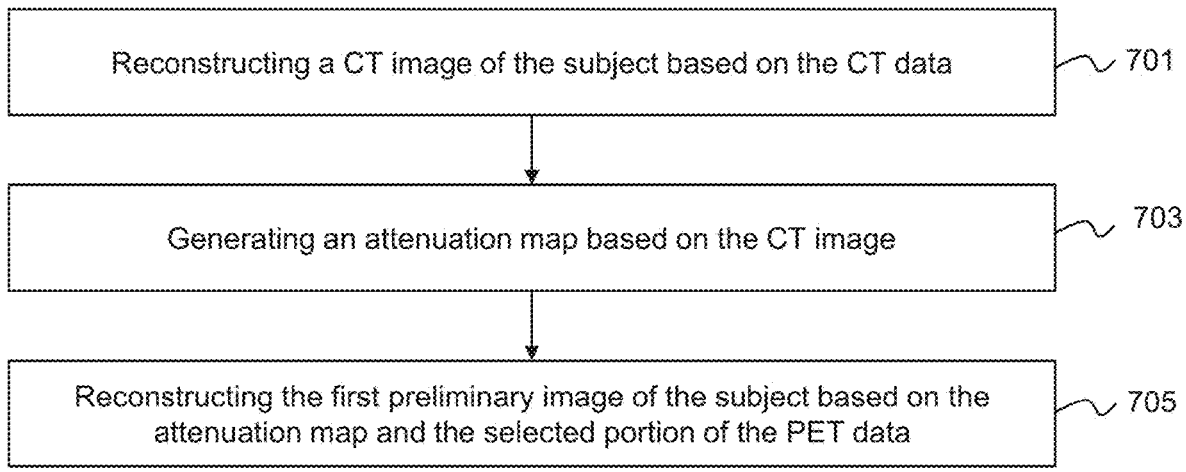
FIG. 7 is a flowchart illustrating an exemplary process for image reconstruction according to some embodiments of the present disclosure.

FIG. 7 is a flowchart illustrating an exemplary process 700 for image reconstruction according to some embodiments of the present disclosure. In some embodiments, one or more operations of the process 700 illustrated in FIG. 7 for generating an image may be implemented in the imaging system 100 illustrated in FIG. 1. For example, the process 700 illustrated in FIG. 7 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3). In some embodiments, the process 700 may be performed to achieve 607 and/or 615 of the operation 600 illustrated in FIG. 6. For illustration purposes, the reconstruction of the first preliminary image is described as an example.

In 701, a CT image of the subject may be reconstructed based on the CT data. Operation 701 may be implemented by the reconstruction module 506. In some embodiments, the CT image may be reconstructed based on one or more reconstruction techniques suitable for CT image reconstruction. For example, the CT image may be reconstructed based on a reconstruction algorithm, such as an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof.

In 703, an attenuation map of the subject may be generated based on the CT image. Operation 703 may be implemented by the reconstruction module 506. The attenuation map may include a plurality of attenuation coefficients of the radiation rays emitted from the scanned subject. In some embodiments, the attenuation map may be generated based on the attenuation coefficients of voxels in the CT image.

In 705, the first preliminary image of the subject may be reconstructed based on the attenuation map and the selected portion of the PET data. Operation 703 may be implemented by the reconstruction module 506. In some embodiments, attenuation correction information for the selected portion of the PET data may be first generated based on the attenuation map, and the first preliminary image may then be reconstructed based on the attenuation correction information for the selected portion of the PET data and the selected portion of the PET data.

For example, a forward projection may be performed on the attenuation map to project of the attenuation map. Merely by way of example, a natural logarithm of the opposite value of the projection of the attenuation map may be designated as the attenuation correction information for the PET data. In some embodiments, the attenuation correction information may be stored in the form of a sinogram (also refer to as the attenuation correction sinogram for brevity). The attenuation correction sinogram may include one or more elements corresponding to the LORs. An element may indicate the attenuation of the photons in the corresponding LOR. The attenuation correction information corresponding to the selected portion of the PET data may then be determined based on the attenuation correction information for the PET data.

The first preliminary image of the subject may be reconstructed based on one or more reconstruction techniques suitable for PET image reconstruction mentioned elsewhere in the disclosure. For example, the first preliminary image may be reconstructed based on one or more iterative reconstruction algorithms, such as an MLEM algorithm, an OSEM algorithm, an MLAA algorithm, an MLACF algorithm, an MLTR algorithm, a conjugate gradient algorithm, a maximum-a-posteriori estimation algorithm, or the like, or any combination thereof.

Taking the OSEM algorithm as an example, the first preliminary image $x^n$ at the $n^{th}$ iteration may be determined based on at least one subset of the selected portion of the PET data and the first preliminary image $x^{n-1}$ at the previous iteration. In some embodiments, the reconstruction of the first preliminary image based on the OSEM algorithm may be performed according to Equation (4) below:

$$x_j^{n,m+1} = \frac{x_j^{n,m}}{\sum_i a_i p_{ij}} \sum_i a_i p_{ij} \frac{y_i}{a_i \sum_l p_{il} x_l^{n,m} + r_i + s_i}, \quad (4)$$

where $x_j^{n,m+1}$ refers to the first preliminary image at the $n^{th}$ iteration using the $(m+1)^{th}$ subset of the selected portion of the PET data, $x_j^{n,m}$ refers to the first preliminary image at the $n^{th}$ iteration using the $m^{th}$ subset of the selected portion of the PET data, $y_i$ refers to the count of coincident events in the $i^{th}$ LOR, $a_i$ refers to the $i^{th}$ element of the attenuation correction sinogram corresponding to the selected portion of the PET data, $p_{ij}$ refers to a system matrix corresponding to the selected portion of the PET data, $r_i$ refers to the count of random events in the $i^{th}$ LOR, and $s_i$ refers to the count of scattering events in the $i^{th}$ LOR. The $i^{th}$ element of the attenuation correction sinogram corresponding to the selected portion of the PET data may represent the attenuation of the photons along the $i^{th}$ LOR. The system matrix corresponding to the selected portion of the PET data may represent the probability that photons generated in an annihilation being detected in the $j^{th}$ voxel travel along the $i^{th}$ LOR.

The $i^{th}$ LOR described herein in the Equation (4) may correspond to the selected portion of the PET data. For example, the $i^{th}$ LOR described herein in Equation (4) may correspond to a coincident event whose detector position difference is equal to or smaller than a threshold as described in connection with 605. The $r_i$ may be determined based on one or more random correction techniques (e.g., a delayed window technique, a single event technique, a tail fitting technique). The $s_i$ may be determined based on one or more scatter correction techniques (e.g., a Monte Carlo simulation technique, a single scatter simulation technique, a dual energy-window technique, and a tail fitting technique).

In some embodiments, the count of coincident events in the $i^{th}$ LOR corresponding to the selected portion of the PET data (i.e., $y_i$) may be determined according to Equation (5) below:

$$y_i = A_i \Sigma_j p_{ij} x_j + r_i + s_i, \qquad (5)$$

where $x_j$ refers to the $j^{th}$ voxel of the first preliminary image.

It should be noted that the above description of the process 700 is merely provided for the purposes of illustration, and not intended to limit the scope of the present disclosure. For persons having ordinary skills in the art, multiple variations and modifications may be made to the process 700 under the teachings of the present disclosure. However, those variations and modifications do not depart from the scope of the present disclosure. In some embodiments, one or more equations exemplified in the description of the process 700 may be modified. For example, one or more parameters in the Equation (4) and the Equation (5) may be replaced or dropped. As another example, one or more parameters may be added to the Equation (4) and the Equation (5).

Figure 8:
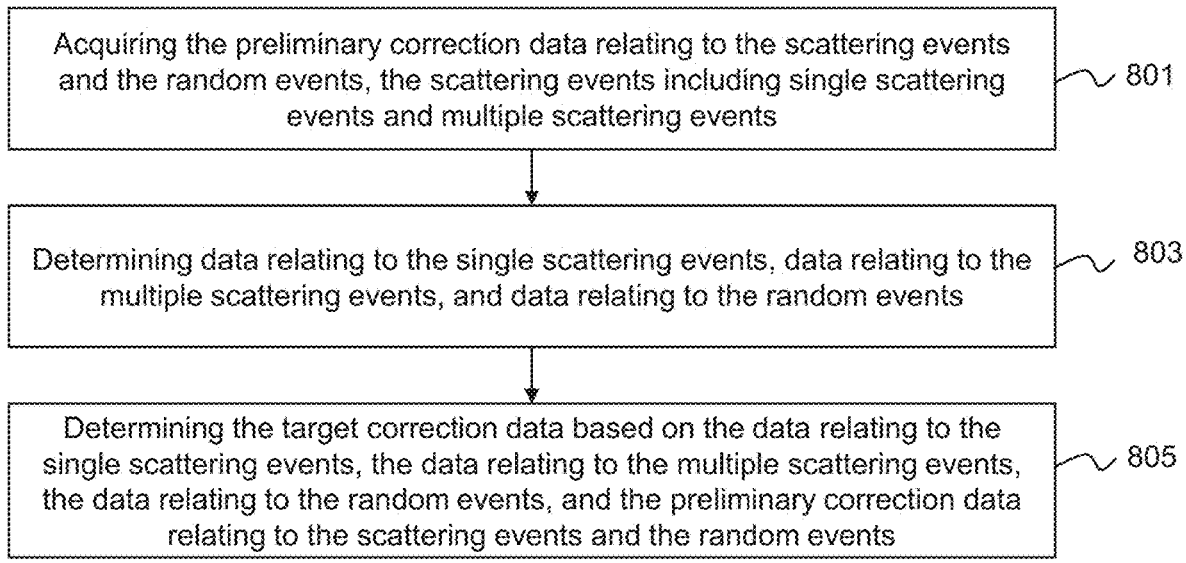
FIG. 8 is a flowchart illustrating an exemplary process for determining target correction data relating to scattering events and random events according to some embodiments of the present disclosure.

FIG. 8 is a flowchart illustrating an exemplary process 800 for determining target correction data relating to scattering events and random events according to some embodiments of the present disclosure. In some embodiments, one or more operations of the process 800 illustrated in FIG. 8 for generating an image may be implemented in the imaging system 100 illustrated in FIG. 1. For example, the process 800 illustrated in FIG. 8 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3). In some embodiments, the process 800 may be performed to achieve 613 of the operation 600 illustrated in FIG. 6.

In 801, the preliminary correction data relating to the scattering events and the random events may be acquired. The scattering events may include single scattering events and multiple scattering events. As described in connection with FIG. 4, the probability of occurrence of the multiple scattering events may increase with the distance that a photon travels across the subject. The PET data based on the PET device with a long axial length may need to be corrected with respect to multiple scattering events.

Operation 801 may be implemented by, e.g., the acquisition module 502. The preliminary correction data may be acquired by the acquisition module 502 from, for example, the storage 150, storage 220, storage 390, or an external data source. The preliminary correction data may be acquired from, e.g., correction module 510. In some embodiments, the preliminary correction data may be determined based on the PET data and the projection of the first preliminary image and stored in, such as the storage 150, storage 220, storage 390, etc. Details regarding the determination of preliminary correction data may be found elsewhere in the present disclosure. See, e.g., FIGS. 4 and 6 and the relevant descriptions.

In 803, data relating to the single scattering events, data relating to the multiple scattering events, and data relating to the random events may be determined. Operation 803 may be implemented by the correction module 510.

The data relating to the single scattering events and the data relating to the multiple scattering events may be determined based on one or more scatter correction techniques. For example, the data relating to the single scattering events and the data relating to the multiple scattering events may be determined by performing a Monte Carlo Simulation based on the first preliminary image of the subject and an attenuation map generated based the CT data (e.g., the attenuation map generated as exemplified in operation 703). The Monte Carlo Simulation technique may track the interaction of a photon in the subject and its detection by the detector in a simulated 3D PET acquisition. The distribution of scattered events (e.g., the single scattering events and the multiple scattering events) may be determined. Details regarding the first preliminary image and/or the attenuation map may be found elsewhere in the present disclosure. See, e.g., FIGS. 6 and 7 and the relevant descriptions.

The data relating to the random events may be determined based on one or more random correction techniques. Exemplary random correction techniques may include a delayed window technique, a single event technique, a tail fitting technique, or the like, or any combination thereof.

In some embodiments, the data relating to the single scattering events, data relating to the multiple scattering events, and data relating to the random events may be stored in the form of a sinogram (as exemplified in FIGS. 10A and 10B). For example, an LOR may be defined as ($\rho$, $\varphi$, z) as exemplified in FIGS. 10A and 10B. The $\rho$ may refer to the shortest distance the Z axis and the LOR. The $\varphi$ may refer to an angle formed by the X-axis and the projection of the LOR onto a transaxial plane. The z may refer to the detector ring difference of the LOR. For illustration purposes, the data relating to the single scattering events, the data relating to the multiple scattering events, and the data relating to the random events in the form of the sinogram may be denoted as S1($\rho$, $\varphi$, z), S2($\rho$, $\varphi$, z), and R($\rho$, $\varphi$, z), respectively.

In 805, the target correction data may be determined based on the data relating to the single scattering events, the data relating to the multiple scattering events, the data relating to the random events, and the preliminary correction data relating to the scattering events and the random events. Operation 805 may be implemented by the correction module 510.

In some embodiments, the target correction data may be a weighted sum of the data relating to the single scattering events, the data relating to the multiple scattering events, and the data relating to the random events. The weighted coefficients of the data relating to single scattering events, the data relating to the multiple scattering events, and the data relating to the random events may be determined according to a fitting technique. For instance, the weight coefficients may be determined according to Equation (6) below:

$$\tilde{\alpha}_z, \tilde{\beta}_z, \tilde{\gamma}_z = \underset{\alpha_z, \beta_z, \gamma_z}{\operatorname{argmin}} \sum_{\rho, \varphi \in tail(z)} |\alpha_z * S1(\rho, \varphi, z) + \beta_z * S2(\rho, \varphi, z) + \gamma_z * R(\rho, \varphi, z) - \operatorname{add}(\rho, \varphi, z)|^2, \qquad (6)$$

where S1($\rho$, $\varphi$, z) refers to the data relating the single scattering events, $\alpha_z$ refers to a weight coefficient of the data relating to the scattering events, S2($\rho$, $\varphi$, z) refers to the data relating to the multiple scattering events, $\beta_z$ refers to a weight coefficient of the data relating to the multiple scattering events, R($\rho$, $\varphi$, z) refers the data relating to the random events, $\gamma_z$ refers to a weight coefficient of the data relating to the random events, add($\rho$, $\varphi$, z) refers to the preliminary correction data relating to the scattering events and the random events, $\tilde{\alpha}_z$, $\tilde{\beta}_z$, and $\tilde{\gamma}_z$ refers to estimated values of the $\alpha_z$, the $\beta_z$, and the $\gamma_z$ that may minimize the square of the difference between the "$\alpha_z$*S1($\rho$, $\varphi$, z)+$\beta_z$*S2($\rho$, $\varphi$, z)+$\gamma_z$*R($\rho$, $\varphi$, z)" and the add($\rho$, $\varphi$, z).

The target correction data relating to the scattering events and the random events may be determined according to Equation (7) below:

$$G(\rho,\varphi,z)=\tilde{\alpha}_z*S1(\rho,\varphi,z)+\tilde{\beta}_z*S2(\rho,\varphi,z)+\tilde{\gamma}_z*R(\rho,\varphi,z), \quad (7)$$

where G($\rho$, $\varphi$, z) refers to the target correction data stored in the form of a sinogram (as exemplified in FIGS. 10A and 10B). The G($\rho$, $\varphi$, z) may be transformed to a column vector $G_i$. The $i^{th}$ element of the $G_i$ may indicate the target correction data of the $i^{th}$ LOR (e.g., additive correction terms including the random and scatter corrections in $i^{th}$ LOR).

It should be noted that the above description of the process 800 is merely provided for the purposes of illustration, and not intended to limit the scope of the present disclosure. For persons having ordinary skills in the art, multiple variations and modifications may be made to the process 800 under the teachings of the present disclosure. However, those variations and modifications do not depart from the scope of the present disclosure. For example, one or more equations exemplified in the description of the process 800 may be modified. For example, one or more parameters in the Equation (6) or the Equation (7) may be replaced or dropped. As another example, one or more parameters may be added to the Equation (6) or the Equation (7).

Figure 9:
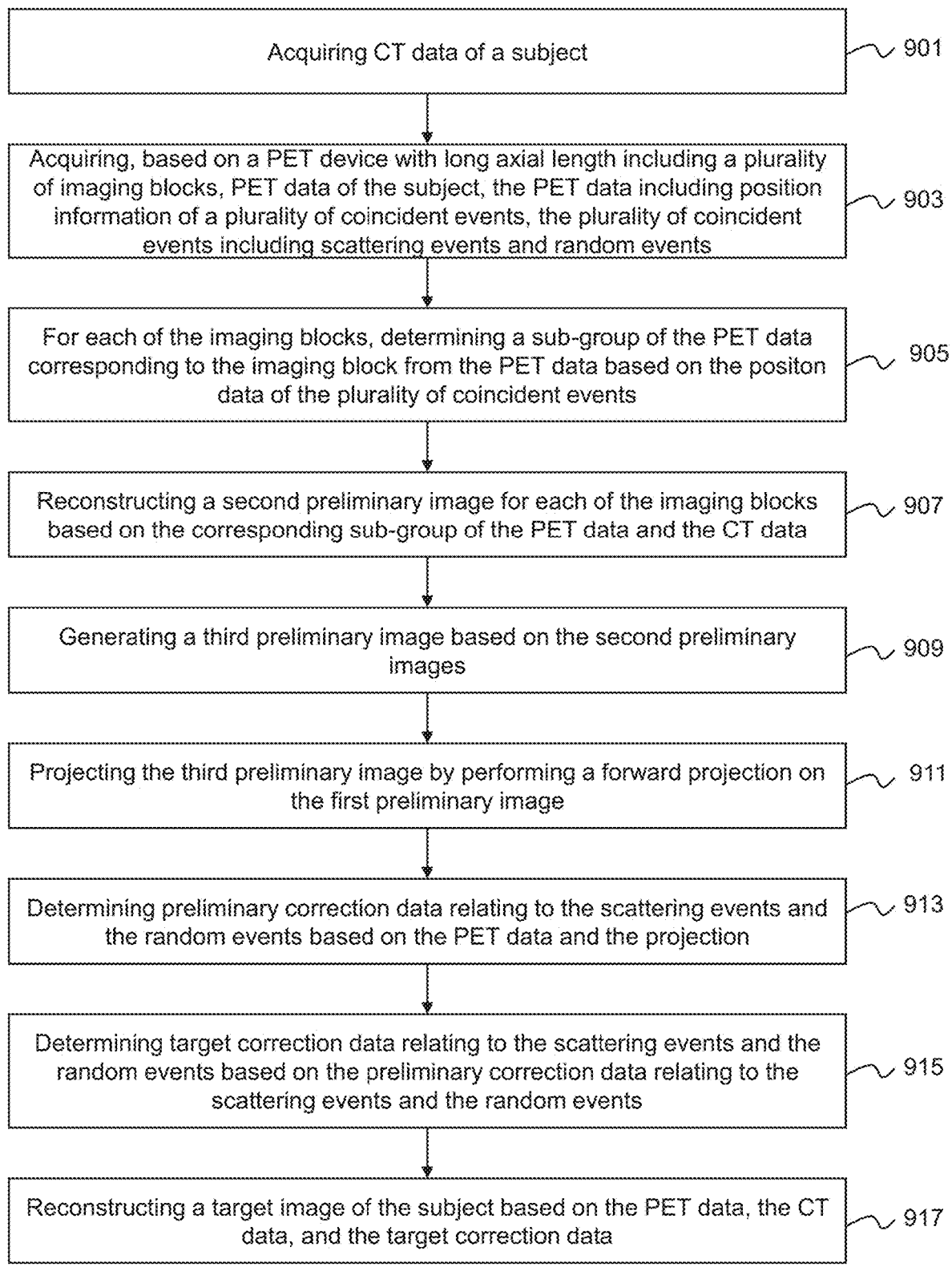
FIG. 9 is a flowchart illustrating an exemplary process for reconstructing an image according to some embodiments of the present disclosure.

FIG. 9 is a flowchart illustrating an exemplary process 900 for reconstructing an image according to some embodiments the present disclosure. In some embodiments, one or more operations of the process 900 illustrated in FIG. 9 for generating an image may be implemented in the imaging system 100 illustrated in FIG. 1. For example, the process 900 illustrated in FIG. 9 may be stored in the storage 150 in the form of instructions, and invoked and/or executed by the processing engine 140 (e.g., the processor 210 of the computing device 200 as illustrated in FIG. 2, the CPU 340 of the mobile device 300 as illustrated in FIG. 3). In some embodiments, process 900 may be an example of the process 600 illustrated in FIG. 6.

In 901, CT data of a subject may be acquired. Operation 901 may be implemented by the acquisition module 502. Operation 901 may be similar to operation 601, and the descriptions thereof are not repeated herein.

In 903, PET data of the subject may be acquired. Operation 903 may be implemented by the acquisition module 502. The PET data may be based on a PET device with a long axial length including a plurality of imaging blocks. The PET data may include position information of a plurality of coincident events. The plurality of coincident events including scattering events and random events. The PET data and the acquisition of the PET data may be similar to that described in connection with operation 603, and the descriptions thereof are not repeated herein.

The PET device with a long axial length may include a plurality of imaging blocks. An imaging block may include one or more detector rings. The axial length of the PET device may be a sum of the axial lengths of the imaging blocks. For example, a PET device may include six imaging blocks. The axial length of each imaging block may be 33 cm. The axial length of the PET device may be 198 cm. Details regarding the imaging block and/or the PET device with a long axial length may be found elsewhere in the present disclosure. See, e.g., FIGS. 4 and 6 and the relevant descriptions.

In 905, a sub-group of the PET data for each imaging block may be determined from the PET data based on the position data of the plurality of coincident events. Operation 905 may be implemented by the selection module 504. A sub-group of the PET data corresponding to an imaging block may include data of coincident events detected by a pair of detector units that are located in the imaging block. For example, the sub-group corresponding to the second imaging block may include data of coincident events detected by two detector units located in the second imaging blocks.

The position data of a coincident event may include but is not limited to detector positions of the two detector units that detect the coincident event as described in connection with operation 603. The detector positions may include serial numbers of the imaging blocks in which the detector units are located. The sub-group of the PET data for each imaging block may be determined based on the position data for each coincident event (e.g., the serial numbers of the imaging blocks in which the detector units are located). In some embodiments, the sum of the sub-groups of the PET data for the imaging blocks may be designated as the filtered data as described in connection with FIG. 6.

In 907, a second preliminary image for each of the imaging blocks may be determined based on the corresponding sub-group of PET data and the CT data. Operation 907 may be implemented by the reconstruction module 506. In some embodiments, the second preliminary images may be reconstructed based on one or more reconstruction techniques suitable for PET image reconstruction described elsewhere in this disclosure. For example, the second preliminary images may be reconstructed based on one or more iterative reconstruction algorithms, such as an MLEM algorithm, an OSEM algorithm, an MLAA algorithm, an MLACF algorithm, an MLTR algorithm, a conjugate gradient algorithm, a maximum-a-posteriori estimation algorithm, or the like, or any combination thereof.

In some embodiments, the second preliminary images for different imaging blocks may be reconstructed based on the same or different reconstruction techniques. In some embodiments, a second preliminary image may be reconstructed based on the corresponding sub-group of PET data and relevant attenuation correction information. For example, an attenuation map may be generated based on the CT data. Attenuation correction information for the PET data may be generated based on the attenuation map. Relevant attenuation correction information for a sub-group of PET data corresponding to an imaging block may be determined from the attenuation correction information of the PET data. In some embodiments, the attenuation correction information may be stored in the form of a sinogram (as exemplified in FIGS. 10A and 10B). The attenuation correction information for a sub-group of PET data corresponding to an imaging block may include one or more elements each of which indicates the attenuation of the photons in an LOR of the imaging block. Details regarding the attenuation map and the attenuation information may be found elsewhere in the present disclosure. See, e.g., FIG. 7 and the relevant descriptions.

Taking the OSEM algorithm as an example, the second preliminary image $x^n(k)$ of the $k^{th}$ imaging block at the $n^{th}$ iteration may be determined based on at least one subset of the corresponding sub-group of the PET data and the second preliminary image $x^{n-1}(k)$ of the $k^{th}$ imaging block at the previous iteration. In some embodiments, the reconstruction of a second preliminary image of the $k^{th}$ imaging block based on the OSEM algorithm may be performed according to Equation (8) below:

$$x_j^{n,m+1}(k) = \frac{x_j^{n,m}(k)}{\sum_i A_i(k)P_{ij}(k)} \sum_i A_i(k)P_{ij}(k) \frac{y_i(k)}{A_i(k)\sum_l P_{il}(k)x_l^{n,m}(k) + r_i(k) + s_i(k)}, \quad (8)$$

where $x_j^{n,m+1}(k)$ refers to the second preliminary image for the $k^{th}$ imaging block at the $n^{th}$ iteration using the $(m+1)^{th}$ subset of the corresponding sub-group of the PET data, $x_j^{n,m}(k)$ refers to the second preliminary image for the of the $k^{th}$ imaging block at the $n^{th}$ iteration using the $m^{th}$ subset of the corresponding sub-group of the PET data, $y_i(k)$ refers to the count of coincident events in the $i^{th}$ LOR of the k imaging block, $A_i(k)$ refers to the $i^{th}$ element of the attenuation correction sinogram of the $k^{th}$ imaging block, $P_{ij}(k)$ refers to a system matrix corresponding to the $k^{th}$ imaging block, $r_i(k)$ refers to the count of random events in the $i^{th}$ LOR of the $k^{th}$ imaging block, $s_i(k)$ refers to the count of scattering events in the $i^{th}$ LOR of the $k^{th}$ imaging block. The $i^{th}$ element of the attenuation correction sinogram for the $k^{th}$ imaging block may represent the attenuation of the photons along the $i^{th}$ LOR of the $k^{th}$ imaging block. The system matrix of the $k^{th}$ imaging block may represent the probability that photons generated in an annihilation being detected in the $j^{th}$ voxel travel along the $i^{th}$ LOR of the $k^{th}$ imaging block.

The $i^{th}$ LOR of the $k^{th}$ imaging block described herein in the Equation (8) may correspond to the sub-group of the PET data of $k^{th}$ imaging block. For example, the $i^{th}$ LOR of the $k^{th}$ imaging block may correspond to a coincident event detected by a pair of detector units that are located in the $k^{th}$ imaging block. The determinations of the $r_i(k)$ and the $s_i(k)$ may be similar to the $r_i$ and the $s_i$ in Equation (4), respectively.

In some embodiments, the count of coincident events in the $i^{th}$ LOR of the $k^{th}$ imaging block (i.e., $y_i(k)$) may be determined according to Equation (9) below:

$$y_i(k)=A_i(k)\Sigma_j P_{ij}(k)x_j(k)+r_i(k)+s_i(k), \quad (9)$$

where $x_j(k)$ refers to the $j^{th}$ voxel of the second preliminary image of the $k^{th}$ imaging block.

In 909, a third preliminary image may be generated based on the second preliminary images. Operation 909 may be implemented by the reconstruction module 506. The third preliminary image may be generated by combining the second preliminary images or by stitching the second preliminary images together. For illustration purposes, the following example is provided with reference to a PET device with six imaging blocks. The axial length of each of the imaging blocks may be 33 cm. The third preliminary image may be generated according to Equation (10) below:

$$\tilde{x}_j = \begin{cases} \tilde{x}_j(1) & 0 < l < 33 \text{ cm} \\ \tilde{x}_j(2) & 33 < l < 66 \text{ cm} \\ \tilde{x}_j(3) & 66 < l < 99 \text{ cm} \\ \tilde{x}_j(4) & 99 < l < 132 \text{ cm} \\ \tilde{x}_j(5) & 132 < l < 165 \text{ cm} \\ \tilde{x}_j(6) & 165 < l < 198 \text{ cm} \end{cases}, \quad (10)$$

where $\tilde{x}_j$ refers to the third preliminary image, $\tilde{x}_j(k)$ refers to the $k^{th}$ second preliminary image of the $k^{th}$ imaging block, l refers to the axial coordinate of a physical point corresponding to a voxel in the third preliminary image. The axial coordinate of the physical point may refer to a distance along the axial direction between the physical point and a reference location (e.g., the first detector ring of the PET device). In some embodiments, the plurality of the second preliminary images may be stitching together to build the third preliminary image.

The operations 911 to 917 may be similar to the operations 609 to 615 respectively, and the descriptions thereof are not repeated herein.

It should be noted that the above description of the process 900 is merely provided for the purposes of illustration, and not intended to limit the scope of the present disclosure. For persons having ordinary skills in the art, multiple variations and modifications may be made to the process 900 under the teachings of the present disclosure. However, those variations and modifications do not depart from the scope of the present disclosure. In some embodiments, one or more operations of the process 900 may be added or omitted. For example, operation 901 may be omitted. Operation 907 and/or operation 917 may be performed without the CT data. The attenuation correction information for a sub-group of PET data corresponding to an imaging block and/or the PET data may be determined based on other attenuation correction techniques, such as an MLAA-based attenuation correction technique, an MR-based attenuation correction technique, and an Atlas-based attenuation correction technique. In some embodiments, one or more equations applied in the process 900 may be modified. For example, one or more parameters in the Equations (8), (9), or (10) may be replaced or dropped. As another example, one or more parameters may be added to the Equations (8), (9), or (10).

FIGS. 10A and 10B are schematic diagrams illustrating a line of response (LOR) according to some embodiments of the present disclosure. FIG. 10A illustrates the full view of the LOR and FIG. 10B illustrates the transaxial view of the LOR.

As illustrated in FIGS. 10A and 10B, an $LOR_i$ is detected by a pair of detector units in the detector ring $Z_1$ and the detector ring $Z_2$ of a PET device 1010. The PET device may have a long axial length, such as 0.5 meters, 1 meter, 2 meters, or the like. The $LOR_i$ may have a three-dimensional reference coordinate system, for example, the X-Y-Z coordinate as illustrated in FIGS. 10A and 10B. The Z axis may represent the axial direction along which a subject may be moved into or out of the gantry of the PET device 1010. The X axis and Y axis may form an X-Y plane that is perpendicular to the Z axis. The center point O may be a center of a transaxial plane 1020 of the PET device 1010. The LOR', illustrated in FIG. 10B may be the projection of the $LOR_i$ onto the transaxial plane 1020.

In some embodiments, PET data relating the LOR may be stored in the form of a sinogram. For example, the $LOR_i$ may be defined as (ρ, φ, z). The ρ may refer to the shortest distance between the Z axis and the $LOR_i$. The φ may refer to an angle formed by the X-axis and the projection of the $LOR_i$ onto the transaxial plane 1020 (i.e., the $LOR'_i$). The z may refer to a ring difference of the LOR (i.e., a difference between the $Z_1$ and $Z_2$).

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system, comprising:
   at least one storage medium including a set of instructions for reconstructing a positron emission tomography (PET) image; and
   at least one processor configured to communicate with the at least one storage medium, wherein when executing the set of instructions, the system is directed to:
   obtain PET data of a subject acquired by a PET device having an axial length, the PET data including position information of a plurality of coincident events, the plurality of coincident events including scattering events and random events, each coincident event being detected by a pair of detector units of the PET device, and the position information of each coincident event including a first detector position and a second detector position of the pair of detector units;
   for each coincident event, determine a detector position difference between the corresponding first detector position and the corresponding second detector position;
   select, based on the detector position differences of the plurality of coincident events, a portion of the PET data from the PET data;
   determine, based on the selected portion of the PET data, target correction data relating to the scattering events and the random events; and
   reconstruct, based on the PET data and the target correction data, a target image of the subject.

2. The system of claim 1, wherein to determine target correction data relating to the scattering events and the random events based on the selected portion of the PET data, the system is further directed to
   reconstruct, based on the selected portion of the PET data, a first preliminary image of the subject;
   project the first preliminary image;
   determine, based on the PET data and the projection of the first preliminary image, preliminary correction data relating to the scattering events and the random events; and
   determine, based on preliminary correction data relating to the scattering events and the random events, the target correction data relating to the scattering events and the random events.

3. The system of claim 2, wherein to reconstruct the first preliminary image of the subject, the system is further directed to:
   obtain computed tomography (CT) data of the subject;
   reconstruct, based on the CT data, a CT image of the subject;
   generate, based on the CT image of the subject, an attenuation map of the subject; and
   reconstruct, based on the attenuation map and the selected portion of the PET data, the first preliminary image of the subject.

4. The system of claim 2, wherein the scattering events further include single scattering events and multiple scattering events, and wherein to determine the target correction data relating to the scattering events and the random events, the system is further directed to:
   determine first data relating to the single scattering events, second data relating to the multiple scattering events, and third data relating to the random events; and
   determine the target correction data relating to the scattering events and the random events based on the first data, the second data, the third data, and the preliminary correction data relating to the scattering events and the random events.

5. The system of claim 2, wherein to determine the target correction data relating to the scattering events and the random events, the system is further directed to:
   perform a low pass filtering on the preliminary correction data relating to the scattering events and the random events.

6. The system of claim 2, wherein to determine the preliminary correction data relating to the scattering events and the random events, the system is further directed to:
   determine the preliminary correction data relating to the scattering events and the random events by subtracting the projection of the first preliminary image from the PET data.

7. The system of claim 2, wherein the PET device includes a plurality of imaging blocks, wherein to select the portion of the PET data from the PET data, the system is further directed to:
   for each of the plurality of imaging blocks, determine, based on the detector position differences of the plurality of coincident events, a sub-group of the PET data corresponding to the imaging block from the PET data; and
   designate the sub-groups of the PET data as the selected portion of the PET data.

8. The system of claim 7, wherein to reconstruct, based on the selected portion of the PET data, the first preliminary image of the subject, the system is further directed to:
   reconstruct a second preliminary image for each of the plurality of imaging blocks based on the corresponding sub-group of the PET data; and
   generate the first preliminary image by stitching the plurality of second preliminary images together.

9. The system of claim 1, wherein the PET device includes a plurality of detector rings forming a detection tunnel having a cylindrical shape.

10. The system of claim 1, wherein the axial length of the PET device is equal to or greater than 0.5 meters.

11. A method for reconstructing a positron emission tomography (PET) image, comprising:
    obtaining PET data of a subject acquired by a PET device having an axial length, the PET data including position information of a plurality of coincident events, the plurality of coincident events including scattering events and random events, each coincident event being detected by a pair of detector units of the PET device, and the position information of each coincident event including a first detector position and a second detector position of the pair of detector units;
    for each coincident event, determine a detector position difference between the corresponding first detector position and the corresponding second detector position;
    selecting, based on the detector position differences of the plurality of coincident events, a portion of the PET data from the PET data;

determining, based on the selected portion of the PET data, target correction data relating to the scattering events and the random events; and reconstructing, based on the PET data and the target correction data, a target image of the subject.

12. The method of claim 11, wherein the axial length of the PET device is equal to or greater than 0.5 meters.

13. The method of claim 11, wherein the determining target correction data relating to the scattering events and the random events based on the selected portion of the PET data comprises:

reconstructing, based on the selected portion of the PET data, a first preliminary image of the subject;

projecting the first preliminary image;

determining, based on the PET data and the projection of the first preliminary image, preliminary correction data relating to the scattering events and the random events; and determining, based on preliminary correction data relating to the scattering events and the random events, the target correction data relating to the scattering events and the random events.

14. The method of claim 13, wherein the reconstructing the first preliminary image of the subject further comprises:

obtaining computed tomography (CT) data of the subject;

reconstructing, based on the CT data, a CT image of the subject;

generating, based on the CT image of the subject, an attenuation map of the subject; and reconstructing, based on the attenuation map and the selected portion of the PET data, the first preliminary image of the subject.

15. The method of claim 13, wherein the scattering events further include single scattering events and multiple scattering events, and wherein the determining the target correction data relating to the scattering events and the random events further comprises:

determining first data relating to the single scattering events, second data relating to the multiple scattering events, and third data relating to the random events; and determining the target correction data relating to the scattering events and the random events based on the first data, the second data, the third data, and the preliminary correction data relating to the scattering events and the random events.

16. The method of claim 13, wherein the determining the target correction data relating to the scattering events and the random events further comprises:

performing a low pass filtering on the preliminary correction data relating to the scattering events and the random events.

17. The method of claim 13, the determining the preliminary correction data relating to the scattering events and the random events comprising:

determining the preliminary correction data relating to the scattering events and the random events by subtracting the projection of the first preliminary image from the PET data.

18. The method of claim 11, wherein:

the detector position difference of each of the plurality of coincident events includes a ring difference between the pair of detector units detecting the coincident event, and the selected portion of the PET data corresponds to one or more coincident events whose corresponding ring differences are within a ring difference threshold.

19. The method of claim 11, wherein the PET device includes a plurality of imaging blocks, wherein the selecting the portion of the PET data from the PET data further comprises:

for each of the plurality of imaging blocks, determining, based on the position information of the plurality of coincident events, a sub-group of the PET data corresponding to the imaging block from the PET data; and designating a sum of the sub-groups of the PET data as the selected portion of the PET data.

20. A non-transitory computer readable medium embodying a computer program product, the computer program product comprising instructions configured to cause a computing device to:

obtain PET data of a subject acquired by a PET device having an axial length, the PET data including position information of a plurality of coincident events, the plurality of coincident events including scattering events and random events, each coincident event being detected by a pair of detector units of the PET device, and the position information of each coincident event including a first detector position and a second detector position of the pair of detector units;

for each coincident event, determine a detector position difference between the corresponding first detector position and the corresponding second detector position;

select, based on the detector position differences of the plurality of coincident events, a portion of the PET data from the PET data;

determine, based on the selected portion of the PET data, target correction data relating to the scattering events and the random events; and reconstruct, based on the PET data and the target correction data, a target image of the subject.

* * * * *